March 10, 1959
C. W. ROBERTS
2,876,872
FOLDABLE STRUCTURAL MEMBER
Filed Aug. 30, 1954
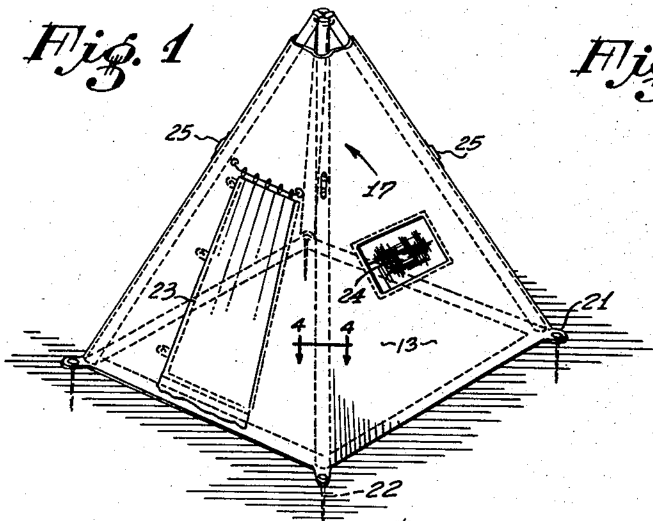
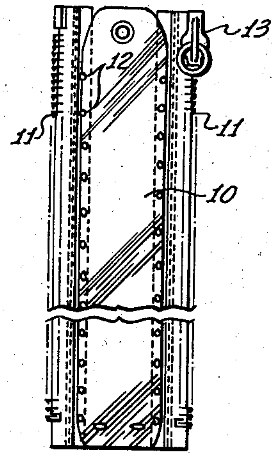
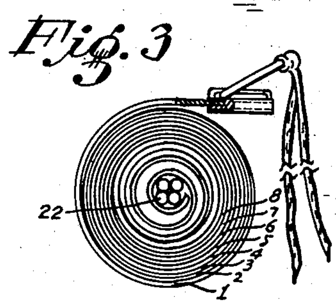
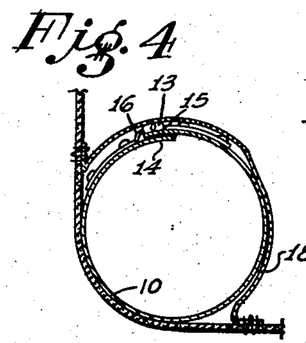
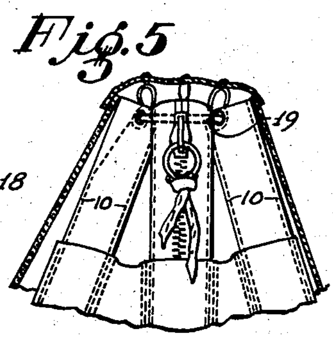
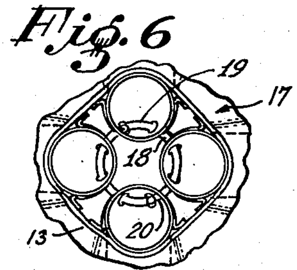
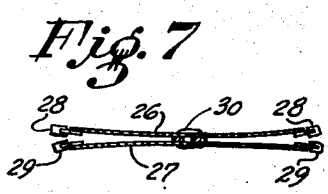
Fig. 8
34 33 34 31 36 36 32
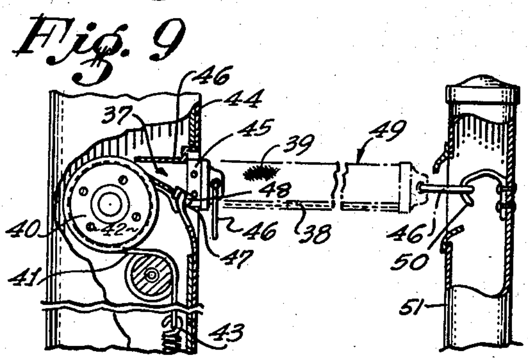
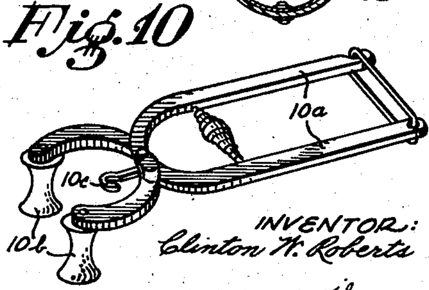
INVENTOR:
Clinton W. Roberts
By George W. Wilson.
His Patent Attorney 2,876,872

FOLDABLE STRUCTURAL MEMBER

Clinton W. Roberts, Inglewood, Calif.

Application August 30, 1954, Serial No. 452,800

1 Claim. (Cl. 189—34)

My invention relates to a structural element and arrangements of such elements designed so that they may be packed into very little space for storage or transportation yet which may be brought into a form suited to give a required amount of support to structures in which the member is incorporated, or in which the element itself constitutes the principal member.

Readily erected shelters for use in camping or to protect supplies and equipment stored in the open, for example, have a wide field of usefulness requiring configurations of different forms, all of which, however, require to be supported. Such supporting elements often make up the greater part of the weight and much of the bulk of such shelters when packed, since the elements are of the same cross section when the shelter is demounted as when lengths of the elements are assembled together to provide a frame work for the erected structure. Solid or tubular frame members are examples of such members whether in lengths screwed or pinned together, or connected by joints.

In the drawings:

Figure 1 is a perspective view of a shelter incorporating structural elements of my invention;

Figure 2 is a fragmentary plan view of one form of the basic element of the structural element of my invention, drawn on a larger scale;

Figure 3 is a side view showing the element of Figure 2 in rolled-up condition and drawn on a smaller scale than in that figure;

Figure 4 is a cross section on the line 4—4 in Figure 1, drawn on a larger scale;

Figure 5 is a fragmentary detail side view drawn on a larger scale of one method of securing together the upper ends of the structural elements in tubular form;

Figure 6 is a fragmentary top plan view of the parts shown in Figure 5, a cover member having been removed for clarity.

Figure 7 is an end view of a structural element in open condition comprised of two of the elements shown in Figure 2, each with its independent zipper closing means but riveted back to back;

Figure 8 is an end view of a U-shaped structural element in erected condition in which a resilient strip and a fabric covering are riveted down a center line, the closing elements being mounted along the edges of the fabric cover;

Figure 9 is a fragmentary view in side elevation of a unit of my invention utilized as a retractable barrier across a theater aisle or the like; and Figure 10 is a perspective view of a tool which may be used to bring a structural element of relatively heavy guage from flat to tubular form.

The basic element of the structural member of my invention, as best shown in Figures 2 and 4, comprises a length of flat spring strip, such for instance as of steel, together with fastening means associated therewith by which the strip may be brought into a curved cross section, preferably circular.

The fastening means preferred by me are of the longitudinally edge locking type usually called zipper fasteners and commercially available mounted on strips of material which can be secured in opposed relation to the edges of openings in bags, garments and the like, and are opened and closed by the longitudinal movement of a slider which is effective to free the edges of the zippers from one another or to mesh the edges together.

In Figure 2, numeral 10 indicates a length of flat stainless spring steel, for instance about 4 inches wide and $\frac{3}{64}$" thick, and numeral 11 indicates heavy duty open end strips of zipper fastener secured along each edge of the flat strip by rivets 12. The zipper elements on opposite edges may be engaged together by the slide fastener 13 which is prevented from leaving one edge element of the zipper fastener at the upper end but may be engaged with the corresponding end of the opposite edge element and slid along both edges, whereby strip 10 is brought into a circular shape, and the edges into firmly locked-in engagement, thus providing a tubular element of considerable rigidity.

Referring to Figure 4 it will be noted that firm engagement of the longitudinal edges 14 and 15 may be effected by engaging one edge 15 between the outer surface of edge 14 and the strip 16.

In the canvas shelter 17 shown in Figure 1, which is of open top pyramid or "tepee" form, the corners of the fabric covering are provided with longitudinal pockets 18, see Figure 6, into each of which a structural element 10 in tubular erected form is inserted. The upper ends of the elements 10 are shown as connected together, see Figures 5 and 6, by a hinged ring 19 which when closed may be secured together by a cotter pin 20.

It will be evident that the structural elements may be readily brought from the form of flat strips to self-supporting tubes and pushed individually into the corner pockets of the canvas tent body and their upper ends then secured together by the ring 19. The foot of one side of the tent is then pulled taut and the corners secured by corner flaps 21 having a grommet hole therein through which ground pegs 22 are driven. The remaining bottom edges and sides may then be similarly erected with ease, since each side is triangulated and therefore self-supporting.

It will be noted that the apex of the tent may be left open to provide ventilation and escape for smoke, which opening may be covered by a detachable cap in heavy rain arranged in any suitable way.

A doorway with a sliding flap closure 23 and a window opening covered by fly net 24 are also indicated.

Loops 25 are shown sewn to the corner lines of the tent to which, and to the flaps 21, ropes may be secured to hold the tent down should the ground be unsuitable for securely holding pegs 22, the ropes could be tied to the pegs driven into cracks between rocks or tied to other suitable supports such as trees.

In Figures 5 and 6 the arrangement of the canvas tent cover 17 and the upper ends of the tubular supports is clearly indicated. It will be noted that, while not rigid, the connection afforded by the ring 19 is secure, and that the tent cover is held against slipping down on the tubular corner supports because of the divergence of the sides.

In the demounted and rolled-up packaged condition of the tent shown in Figure 6, the cover 17 of the tent is shown folded up and rolled around the pegs 22, the edge supporting members in flat form being rolled around the outside of the inner roll and inserted in a cover which may serve as a water bucket when the tent is erected.

While a "tepee" type shelter has been shown for simplicity, it is to be understood that shelters having vertical corner supports provided by the structural elements of my invention, or the type having a center pole, or a center pole and radiating ribs, and others, may be constructed utilizing the elements of my invention.

The tool shown in Figure 10 comprises a pair of pivoted arms 10*a* carrying small inwardly curved rollers 10*b* which may be engaged against the edges of the strip which may be initially bent into a bowed shape. By forcing the arms together the edges of the resilient member may be brought sufficiently close together to enable the sliding element of the closure element to be secured to the hook 10*c* on the tool and the latter pulled along the length of the element, thus bringing the resilient member into tubular shape.

To illustrate the many uses to which the invention may be put and the various ways in which it may be produced, reference is directed to Figure 7 showing a double walled element comprising a pair of spring strips 26 and 27 each being provided with edge zipper strips 28 and 29, respectively, of the type previously described.

The strips may be secured together along their longitudinal center line by spaced rivets 30. In this arrangement the strips may be brought into a "figure of 8" form, the zippers lying on opposite sides of the major axes of the figure, thus providing a relatively deep and strong member suitable for use as a ridge pole, for instance.

By making one strip slightly wider than the other and securing one element in tubular form and then the other around the first with the zippers overlying one another; a strong tubular member suitable for a center pole for a tent can be produced.

In Figure 8 a water conduit is shown provided by a wide spring strip 31 secured to a heavy waterproof canvas backing 32 of considerably greater width than the spring strip and to the edges of which zipper strips 33 are secured. When the zipper is closed, a semicircular conduit is produced which, when interfitted with similar lengths of conduit, will enable running water to be brought for instance into camp from a spring located at some distance and at a higher level than the camp. Preferably tabs 34 are sewn at intervals to the fabric cover, the tabs being provided with grommets by which the conduit may be supported by lengths of rope from tree branches. The interfitting of one length of conduit with another can be effected in any suitable manner as for instance bringing a short length at one end of a length to a slightly tapered form by suitably arranging the zipper strips at that end and pushing the tapered end into the next length of conduit, the ends of conduit lengths being held together by drawing them up together by cords passed through eyeletted tabs 36 sewn to the fabric cover 32 and provided for that purpose.

In Figure 9 the structural element of my invention is shown arranged to serve the purpose of removable aisle barriers such as are used to direct movie goers to ticket takers, entrances to aisles of seats not yet filled, and the like. Such barriers usually are formed as ornamental velvet covered ropes or as brass chains. As shown in Figure 9 such a barrier is advantageously formed from a length 37 of flexible sheet metal with lengths of zipper 38 fastener secured along the edges of the strip as shown in Figure 2. The strip may be plated or covered with an attractive fabric 39 secured to the outer face by a flexible adhesive such as a rubber cement.

The strip is shown rolled in flat condition on a drum 40 which is urged in winding-up direction by a cable 41 wound on a spool 42 secured to a side face of the drum 40 and stressed by a tension spring 43.

The drum 40 is shown mounted in a hollow metal column 44 and the length 37 is permanently held in tubular form at its outer end and fitted with an end cap 45 with a ring 46 secured thereto. Cap 45 rests against the outer end of a throat element 47 mounted in an opening in the side of the column. The slider 48 of the zipper member is pivotally mounted in an opening of the throat member so that when cap 46 is pulled outwardly, the strip 37 is automatically brought into tubular form 49 to act as a barrier in which form it may be maintained by hooking ring 46 over a hook 50 provided on a standard 51. When it is desired to open the aisle by removing the barrier it is only necessary to release ring 46 from hook 50 and release the ring whereupon the strip will be returned from its tubular form 49 to strip form 37 and wound upon drum 40 by the pull of spring 43 on cable 41.

It will be evident that the structural element of my invention is not limited in physical dimensions otherwise than that it must be flexible enough to be tightly rolled or loosely folded on itself while in flat condition, and brought when required for use into a shape curved transversely of its length as previously described, or into a large diameter tubular shape.

For instance when the structural element is arranged to form drum-like containers, top and bottom might be formed as shallow caps while the side of the container may be formed from my structural member of heavy gauge, with zipper closure members extending across the ends of the strip instead of along its sides as in the constructions illustrated.

While various preferred embodiments of my invention have been specifically illustrated, it is to be understood that various modifications of the described elements may be made within the scope of the invention. For instance while a continuous closure member of the zipper type would be generally employed, hook and eye, or press stud fasteners, might be suitable for other uses, and I therefore claim all such modifications as fall within the scope of the appended claim.

What is claimed is:

Foldable structural members self supporting in operative position, comprising: a plurality of long and narrow pieces of flat resilient but stiff material secured together along a line intermediate a pair of longitudinal opposite edges; two part continuous closure elements each having a sliding closing element, one part of each closure element being mounted along one edge and the other part of that closure element being mounted along the opposite edge of each strip, the sliding closing members of said continuous closure elements when moved longitudinally in one direction along said closure elements being effective to secure said edges of each strip in continuous engagement with one another to form each strip into a cylinder, and when moved in the opposite direction completely freeing said edges from one another to enable said strips to return to a flat condition for ready rolling up along their length.

References Cited in the file of this patent

UNITED STATES PATENTS

| | | |
|---|---|---|
| 1,909,066 | Nemec | May 16, 1933 |
| 1,947,392 | Guntemann et al. | Feb. 13, 1934 |
| 2,344,861 | Fowler | Mar. 21, 1944 |
| 2,585,054 | Stachura | Feb. 2, 1952 |

FOREIGN PATENTS

| | | |
|---|---|---|
| 429,609 | Germany | May 31, 1926 |